United States Patent Office 3,432,154
Patented Mar. 11, 1969

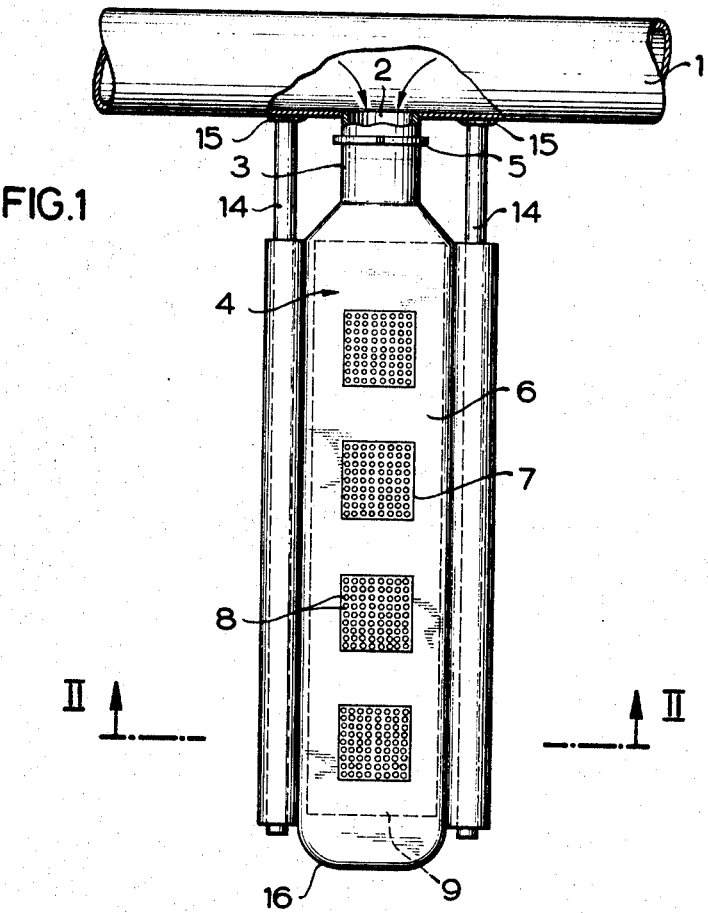
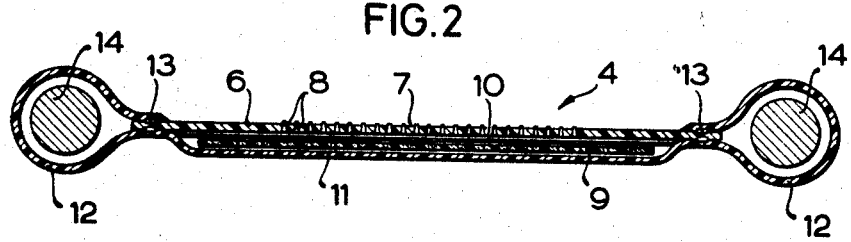

3,432,154
SEWAGE WATER AERATION DEVICE
Martin Hermann Danjes, Hermannstrasse 3,
Detmold, Germany
Continuation-in-part of application Ser. No. 543,596,
Apr. 19, 1966. This application Nov. 29, 1967, Ser.
No. 686,453
U.S. Cl. 261—122       6 Claims
Int. Cl. B01d 47/00

ABSTRACT OF THE DISCLOSURE

The sewage water aeration device consists of a cover foil provided with punched areas under which a flotable plate is arranged, which is tightly enclosed by two foils. When air is supplied into the device the cover foil expands and the air is admitted through its holes in fine bubbles into the sewage water. As the air supply is interrupted the aeration holes are sealed from below by the uplift of the flotable plate and the sewage water is barred from blocking said holes.

---

Figure 3:
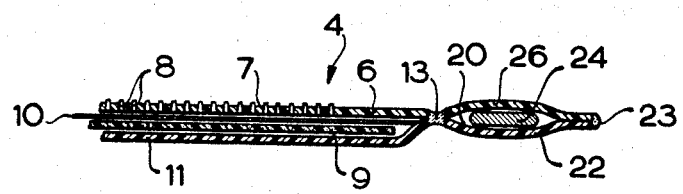

This application is a continuation-in-part of my application Ser. No. 543,596, filed Apr. 19, 1966, now abandoned.

The present invention relates to a sewage water aeration device for biological cleansing of sewage water.

An object of the invention is to provide an aeration device which ensures aeration of the sewage water by fine bubbles in any water depth and which prevents sewage water from reaching and blocking the air outlet openings, if the air supply is interrupted.

Another important object is an aeration device which can easily be exchanged and can be placed in precise horizontal direction to ensure issue of precisely like quantities of air from the various aeration holes.

Still another object of the invention is the provision of an aeration device which enables undisturbed and even issue of fine air bubbles when the device is moved across the stationary sewage water or is stationary in a transverse flow of sewage water.

A further object is to provide an aeration device which is simple and inexpensive in manufacture and manifold in use.

These and other objects of the invention will become apparent from the following description which is made in connection with the accompanying drawings in which two embodiments of the invention are shown for the purpose of illustration.

In the drawings:
FIG. 1 is a top view of an embodiment of an aeration device according to the invention;
FIG. 2 is a partial sectional view taken in the plane II—II of FIG. 1;
FIG. 3 is a partial sectional view in accordance with FIG. 2 of another embodiment of the invention.

In biological cleansing of sewage water in the activated sludge process the cleansing effect largely depends on an even aeration by fine bubbles allowing for a maximum of oxygen to be absorbed by the sewage water. The ceramic filter bodies which have so far largely been used for aeration purposes are provided with fine air pores but they are of an uneven structure, and the single pores are in such close neighbourhood to one another that the air bubbles on being issued from the filter body easily unite into one large bubble. As another disadvantage, such filter bodies are liable to being blocked by bacterias contained in the sewage water.

These disadvantages are eliminated by the invention in that it enables an even aeration of the sewage water with fine air bubbles by providing for the aeration elements which are submerged in water to be covered by a foil of a plastic material. The foil has a plurality of areas which are spaced from one another and are spread over the whole of its surface, each of them being provided with numerous small nozzle-shaped air outlet holes, and together with a flexible base the foil forms a hose-like air channel the two longitudinal edges of which surround horizontal supporting members. With these longitudinal edges, an aeration element of the described type may easily be pushed over the horizontal supporting members and may therefore be exchanged in a simple manner without it being necessary to apply any particular tools for this purpose. The air holes in the sections of the cover foil are of a diameter of approximately 0.1 mm. and are liable to being blocked by floating substances and bacterias in the sewage water if the air supply is interrupted. To enable an intermittent operation of the device in spite of this, the bottom of the aeration element is a plate of a floatable substance, such as foam rubber, and has an impermeable cover formed by two foils welded to each other in which it is enveloped. When the air supply is interrupted this flotable plate by its uplift is pushed from below against the air holes of the cover foil and thereby prevents instrusion of water or contaminations into these holes. As a result, the holes will not be blocked even if the interruption of operation prevails for some length of time. In this manner, the aeration device is ready for operation at any time.

Insertion of the aeration element into the aeration device is made particularly simple if the two foils covering the flotable bottom plate of the aeration element are at the longitudinal edges of the cover foil provided with a loop-like guidance and are welded to these longitudinal edges. The loop caused by this arrangement forms a pocket which may easily be pushed over the horizontal supporting members of the aeration element. Air supply of the aeration element may in a simple manner be obtained by providing one end of said element in a hose-like shape which will be pushed over a corresponding connection piece of an air supply pipe and is tightly fastened to it, for instance by a clamp.

If the aeration element is transversely moved through the sewage water or is stationary in a transverse current of the water it is recommendable to choose a flat profile for the horizontal supporting members of the aeration element and to surround these members with marginal strips of the cover foil and of the bottom foil, which foils are connected with each other by welded seams extending parallelly of each other. If the profile of said supporting members is of largest extension in horizontal direction and of smallest extension in vertical direction both supporting members project only a little over the aeration element and therefore cannot cause any disturbing whirlings of the sewage water, which arrangement ensures even feed of the small air bubbles into the sewage water.

Referring now especially to FIG. 1 of the drawings, an air supply pipe 1 is provided with a socket 2 to receive a hose-shaped extension 3 of an aeration element 4 which is pushed over it and fastened to it in an air-tight manner by means of a hose clamp 5, or by similar means.

As shown in a larger scale in the sectional view of FIG. 2 the aeration element is formed by a cover foil 6 which has a plurality of approximately square areas 7 evenly distributed over the whole of its length and being each provided with numerous small air outlet holes 8 in nozzle-like shape. The cover foil 6 consists of a thermoplastic substance, such as polyvinyl chloride, and has a thickness of approximately 0.5 mm. The bottom of the aeration element 4 is formed by a plate 9 of a foam substance the gravity of which is smaller than that of water so that plate 9 when submerged in water causes an uplift or a buoyancy. The plate 9 is enclosed by a liquid-proof envelope consisting of foils 10 and 11 respectively. The upper or center foil 10, for instance, may consist of a polyvinyl chloride layer of a thickness of 0.1 mm., whereas the lower or bottom foil 11, also of polyvinyl chloride, has a thickness of approximately 0.5 mm. and at both the longitudinal edges of aeration element 4 forms a loop 12 which is by a welded seam 13 welded to the cover foil 6 and to the thin center foil 10. The loop 12 formed by bottom foil 11 encloses a horizontal supporting rod 14. As is apparent from FIG. 1, the two parallel supporting rods 14 at the longitudinal edges of aeration element 4 are by a welded seam 15 rigidly connected with the air admission pipe 1. At its external end 16 the aeration element 4 is closely welded to the bottom foil 11.

If pressurized air is fed through the pipe 1 into the aeration element 4, cover foil 6 bulges upwards and the bottom parts 9, 10 and 11 bulge downwards. This results in the formation of a hose like aeration channel from which the air is through the numerous nozzle-shaped narrow air outlet holes 8 in the form of evenly spread fine bubbles fed into the surrounding sewage water. If the air supply is interrupted the cover foil 6 and the bottom parts 9, 10, 11 are closely compressed by the hydrostatic pressure of the surrounding liquid. The foam plate 9, being of very low specific gravity, has a big uplift in the water and therefore bears against the bottom of cover foil 6 with great force, closing its air holes 8 and thus preventing the surrounding water from penetrating into them and blocking them with its mud particles. The air holes 8 therefore remain clean even after lengthy interruptions of operation so that the device is always ready for use. This enables the device to be used for any type of intermittent operation. Since the nozzle-like air holes 8 are of precisely like shape the quantity of air being issued into the sewage water will always be the same, no matter whether the aeration element 4 is longer or shorter, provided, however, the aeration element is in exactly horizontal position into which it may be placed by adequate adjustment of the two supporting rods 14 before they are welded together with the air supply pipe 1. Because of its close envelopment in foils 10 and 11 the foam substance plate 9, too, is protected against water intrusion and thereby permanently maintains its floatability.

As the aeration element consists of non-metallic foils its durability remains unimpaired even though the sewage water may be strongly aggressive. If necessary, however, the aeration element 4 may, after detachment of hose clamp 5, readily be pulled from the socket 2 and from the two supporting rods 14 and be exchanged for a new element. The exchange may take place when the settling tank has been emptied; it does not require any additional arrangements.

In the embodiment of the invention shown in FIG. 3 the aeration element is at both its longitudinal edges carried by flat supporting members 24 the profile of which is of largest extension in horizontal and of smallest extension in vertical direction which causes them to project only a little over the surface of the aeration element 4. In lieu of the loop-like pocket 12 the extended marginal strips 22 of bottom foil 11 and, at the top, an extension of cover foil 6 are provided to envelop each of the two parallel supporting members 24. The foils 6 and 11 are welded together not only by the welded seam 13 but also by an external welded seam 23 extending at the outside parallel of each supporting member 24.

If the aeration element is moved transversely across the sewage water or is stationary in a transverse current the flat supporting members 24 cannot cause any disturbing whirlings of the water. The sewage water therefore through the air holes of cover foil 6 receives an even aeration of fine bubbles independently of the prevailing relative motion between aeration element and surrounding sewage water.

It is a notable advantage that the aeration device according to the invention may be arranged at any desired water depth since the issue of fine bubbles and the protection of the air holes against blockage at intermittent operation of the device is safeguarded even when the aeration device is lowered to the deepest levels occurring in practical use.

The embodiments of the invention shown in the drawings are meant to be examples only, and they may be modified without departing from the spirit of the invention.

What I claim is:

1. A device for aeration of sewage water with aeration elements arranged beneath the water surface, in which the improvement comprises an aeration element, consisting of a cover foil provided with air holes, a bottom plate of a flotable substance, a center foil and a bottom foil, both said foils enveloping said flotable plate and in waterproof connection with said cover foil, means for connecting the aeration element to an air admission pipe, horizontal supporting elements, arranged at both longitudinal edges of the aeration element, and an air space between said cover foil and said bottom part, bulging out when pressurized air is admitted into it and collapsing when air admittance is interrupted, said flotable plate sealing said air holes of the cover foil against water intrusion.

2. An aeration element according to claim 1 in which the bottom foil at both its edges forms a loop-like pocket for detachable installation of said two horizontal supporting elements.

3. An aeration element as described in claim 1 in which the air holes of said cover foil are arranged in square sections spaced from one another and distributed over the whole length of the aeration element.

4. An aeration element as described in claim 1 in which means for detachable connection of the aeration element to an air admission pipe are provided.

5. An aeration element as described in claim 1 in which said horizontal supporting elements are of a flattened profile and are enveloped by peripherical strips of said cover and bottom foils, wthich foils are connected with each other by parallel welded seams.

6. An aeration element as described in claim 1 in which the profile of said supporting elements is of largest extension in horizontal direction and of smallest extension in vertical direction.

References Cited

UNITED STATES PATENTS

| | | | |
|---|---|---|---|
| 1,642,051 | 9/1927 | Wall | 261—122 |
| 1,920,719 | 8/1933 | Stich | 261—122 |
| 3,063,689 | 11/1962 | Coppock | 261—124 |
| 3,315,895 | 4/1967 | Klingbeil et al. | 261—122 X |

TIM R. MILES, *Primary Examiner.*

U.S. Cl. X.R.

261—124